United States Patent
Rekhi

(10) Patent No.: US 9,667,678 B2
(45) Date of Patent: *May 30, 2017

(54) PROVIDING SOCIAL CONTEXT TO CALENDAR EVENTS

(71) Applicant: LinkedIn Corporation, Mountain View, CA (US)

(72) Inventor: Sachin Rekhi, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,137

(22) Filed: Jul. 9, 2015

(65) Prior Publication Data

US 2015/0312293 A1  Oct. 29, 2015

Related U.S. Application Data

(63) Continuation of application No. 13/364,139, filed on Feb. 1, 2012, now Pat. No. 9,111,318.

(51) Int. Cl.
| | |
|---|---|
| *H04L 29/08* | (2006.01) |
| *H04L 29/06* | (2006.01) |
| *G06Q 50/00* | (2012.01) |
| *G06Q 10/10* | (2012.01) |

(52) U.S. Cl.
CPC ......... *H04L 65/403* (2013.01); *G06Q 10/109* (2013.01); *G06Q 50/01* (2013.01); *H04L 67/10* (2013.01)

(58) Field of Classification Search
CPC ....... H04L 65/403; H04L 67/10; G06Q 50/01; G06Q 10/109
See application file for complete search history.

(56) References Cited

U.S. PATENT DOCUMENTS

| | | | |
|---|---|---|---|
| 9,111,318 B1 | 8/2015 | Rekhi | |
| 9,225,582 B1* | 12/2015 | Conway | .................. H04M 1/57 |
| 2007/0112915 A1* | 5/2007 | Klassen | ............... G06Q 10/107 |
| | | | 709/206 |

(Continued)

OTHER PUBLICATIONS

U.S. Appl. No. 13/364,139, filed Feb. 1, 2012, Providing Social Context to Calendar Events.

(Continued)

*Primary Examiner* — Dustin Nguyen
*Assistant Examiner* — Juan C Turriate Gastulo
(74) *Attorney, Agent, or Firm* — Schwegman Lundberg & Woessner, P.A.

(57) ABSTRACT

A daily connection facility is available to the user either through a webpage or by e-mail in the form of a synopsis of connection identifiers between the user and their contacts. The web-based version presents connection information in the form of an agenda view, an engage view, and a reminder view. Each view type is selectable by corresponding tab on the webpage. The daily connected e-mail presents an agenda of meetings and events by location, title, and time. The daily connected e-mail also presents interesting profile and connection information about the attendees such as their communications in blogs and postings, recent communications with user, including messages and meetings, as well as contact information and a list of other contacts in common.

18 Claims, 18 Drawing Sheets

(56) References Cited

U.S. PATENT DOCUMENTS

| | | | |
|---|---|---|---|
| 2007/0124396 A1* | 5/2007 | Febonio | G06Q 10/107 709/206 |
| 2007/0185964 A1* | 8/2007 | Perlow | H04L 12/1831 709/207 |
| 2009/0216569 A1* | 8/2009 | Bonev | G06F 17/30029 705/5 |
| 2011/0119593 A1* | 5/2011 | Jacobson | G06Q 30/02 715/736 |
| 2011/0145342 A1 | 6/2011 | Berger et al. | |
| 2011/0185285 A1* | 7/2011 | Augustine | G06Q 10/10 715/751 |
| 2012/0124153 A1* | 5/2012 | Carroll | G06Q 10/107 709/206 |
| 2012/0317498 A1* | 12/2012 | Logan | G06F 3/04817 715/752 |
| 2012/0323928 A1* | 12/2012 | Bhatia | G06F 17/30528 707/748 |
| 2013/0013698 A1* | 1/2013 | Relyea | H04L 67/06 709/206 |
| 2013/0014040 A1 | 1/2013 | Jagannathan et al. | |

OTHER PUBLICATIONS

"U.S. Appl. No. 13/364,139, Non Final Office Action mailed Sep. 29, 2014", 28 pgs.

"U.S. Appl. No. 13/364,139, Notice of Allowance mailed Apr. 14, 2015", 32 pgs.

"U.S. Appl. No. 13/364,139, Preliminary Amendment filed Feb. 6, 2012", 2 pgs.

"U.S. Appl. No. 13/364,139, Response filed Jan. 29, 2015 to Non-Final Office Action mailed Sep. 29, 2014", 20 pgs.

* cited by examiner

```
┌─────────────────────────────────────────────────────────────────┐
│ DETERMINE A CONNECTION THRESHOLD OF A CONNECTION DESCRIPTOR, THE │ ─1310
│ CONNECTION THRESHOLD DETERMINING INCLUSION OF THE CONNECTION     │
│ DESCRIPTOR IN THE TRANSMITTING AT LEAST A PORTION OF A SET OF    │
│ CONNECTION INFORMATION, AND THE CONNECTION THRESHOLD DETERMINED  │
│ ACCORDING TO:                                                    │
└─────────────────────────────────────────────────────────────────┘
                                 ↓
┌─────────────────────────────────────────────────────────────────┐
│ LOCATE A NETWORK POSTING OF THE CONNECTION DESCRIPTOR REVEALING A│ ─1320
│              CONTENT INCLUDING ONE OF                            │
└─────────────────────────────────────────────────────────────────┘
                                 ↓
┌─────────────────────────────────────────────────────────────────┐
│       AN INTEREST IN ONE OF A HOBBY, A SPORT, AND AN ACTIVITY    │ ─1330
└─────────────────────────────────────────────────────────────────┘
                                 ↓
┌─────────────────────────────────────────────────────────────────┐
│       AN ATTENDANCE OF ONE OF A CONFERENCE, A CONVENTION, A      │ ─1340
│                    PRESENTATION, AND A SHOW                      │
└─────────────────────────────────────────────────────────────────┘
                                 ↓
┌─────────────────────────────────────────────────────────────────┐
│ AN INDICATION OF ONE OF AN AFFINITY TOWARD AND AN INTEREST TO SHARE A │ ─1350
│ CONNECTION EVENT INCLUDING ONE OF AN ENTERTAINMENT EVENT, A      │
│ SPORTING EVENT, A TEAM EVENT, A CONCERT, AND A PERFORMANCE       │
└─────────────────────────────────────────────────────────────────┘
```

PROVIDING SOCIAL CONTEXT TO CALENDAR EVENTS

RELATED APPLICATIONS

This application is a continuation of and claims the benefit of priority under 35 U.S.C. §120 to U.S. patent application Ser. No. 13/364,139, entitled "PROVIDING SOCIAL CONTEXT TO CALENDAR EVENTS," filed on Feb. 1, 2012, which is hereby incorporated by reference herein in its entirety.

TECHNICAL FIELD

This patent document pertains generally to data processing, and more particularly, but not by way of limitation, to providing social context to calendar events.

BACKGROUND

Online address book users face a considerable challenge in managing all of the professional interactions with their connections. The online address book provides general contact information and event information such as meeting information. Contact information includes name, e-mail address, phone numbers, location information for work and possibly home. Event details may include a title or subject of a meeting, a time, and a location. Yet neither of these threads of information present a cohesive picture when the online address book users preparing for the meeting. It can be left the user to search through previous communications and historical calendar pages to collect an idea of recent communication and interaction with a contact they will interact with in an upcoming meeting. The user faces a daunting task of trying to assemble a complete picture of their connections with a given contact in a concise fashion and in a reasonable amount of time.

BRIEF DESCRIPTION OF DRAWINGS

Some embodiments are illustrated by way of example and not limitation in the figures of the accompanying drawings in which:

FIG. 7 is a diagrammatic representation of a daily e-mail of connection information, as may be used in an example embodiment;

FIG. 13 is a flow chart illustrating a method to determine a common interest to share in communication, as may be used in an example embodiment;

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Environment

Figure 1:
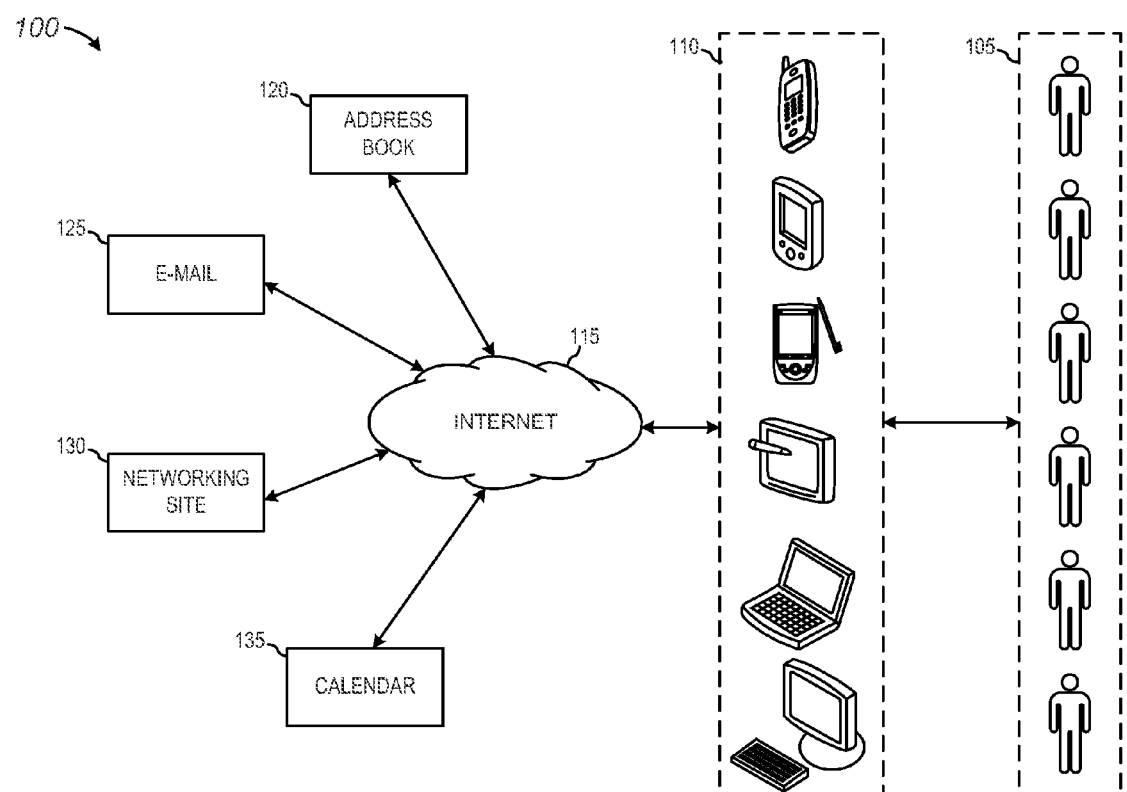
FIG. 1 is a block diagram illustrating communication environment of networking contacts, according to example embodiment.

FIG. 1 is a block diagram illustrating a communication environment of networking contacts 100, according to an example embodiment. A large number of Internet users 105 may use a variety of electronic communications devices 110 to connect to the Internet 115 and maintain communication with other Internet users 105. Internet users 105 may in the course of their utilization of the Internet 115 end up maintaining contact information across a number of contact information sites on the Internet 115. Some of the contact information sites may include an address book provider 120, an e-mail provider 125, a networking site 130, a contacts aggregator (not shown), and a calendar provider 135.

Interfaces

The generated daily agenda is based on an aggregation of company information, calendar events, contacts, and daily engage events across social network activity. The agenda view presents information about people and companies the user may be meeting with today. In attendee may be presented including their contact information, and con contact descriptors such as blogs that participate in, their likes, and pursuits.

Figure 2:
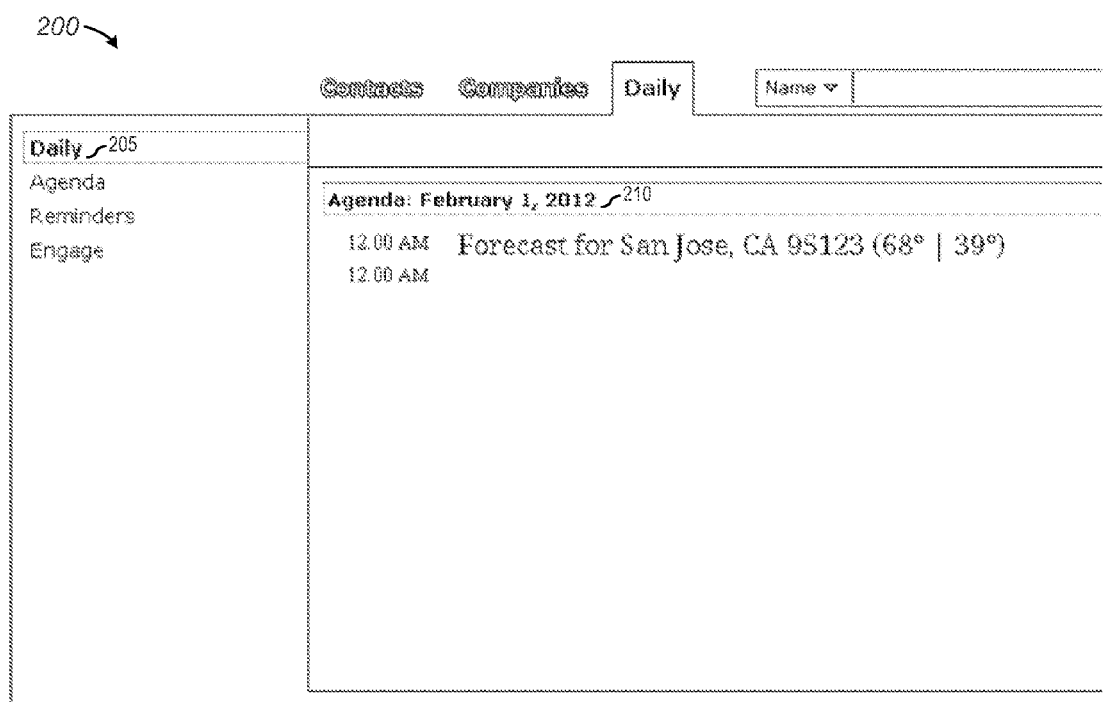
FIG. 2 is a diagrammatic representation of a daily connection information webpage, as may be used in an example embodiment.

FIG. 2 is a diagrammatic representation of a daily connection webpage 200, as may be used in an example embodiment. The daily connection webpage 200 includes a daily connections tab 205 that when selected display is a collection of agenda items, reminders, recent engagements, recent communications, and a further connection items in common with the user in the contact's displayed.

Figure 3:
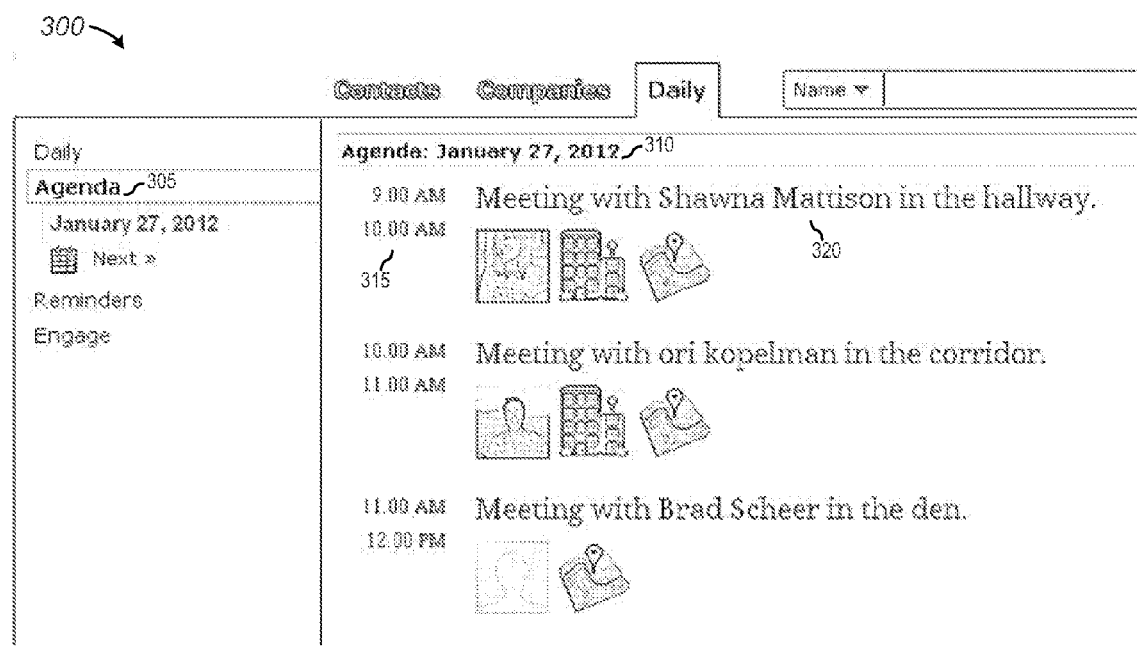
FIG. 3 is a diagrammatic representation of a daily agenda information webpage, according to example embodiment.

FIG. 3 is a diagrammatic representation of a daily agenda webpage 300, according to example embodiment. The daily agenda webpage 300 includes a daily agenda tab 305 that when selected produces the display of daily agenda items banner 310 is displayed including the day's date. Meeting and engagement information is displayed below the daily agenda items banner 310. Event details include a time range 315 and an engagement title 320. The engagement title 320 may also include subject details relating to the engagement.

Figure 4:
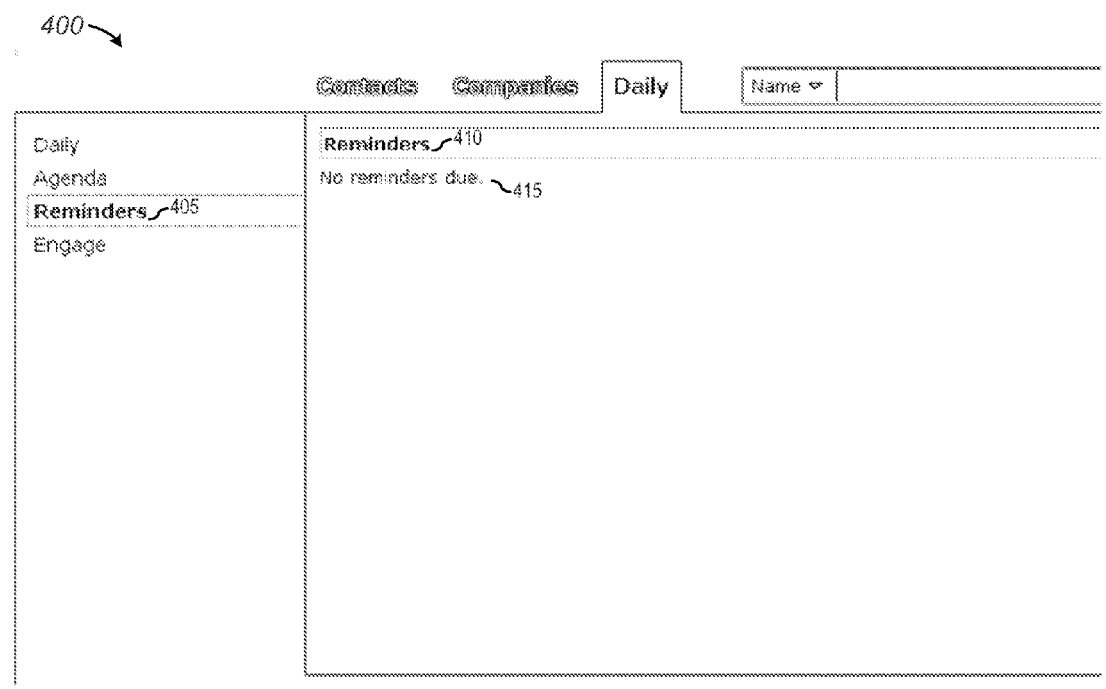
FIG. 4 is a diagrammatic representation of a daily reminders information webpage, as may be used in an example embodiment.

FIG. 4 is a diagrammatic representation of a daily reminders webpage 400, as may be used in an example embodiment. The daily reminders webpage 400 may include a daily reminders tab 405 that when selected causes the display of a reminders banner 410 under which a reminders listing 415 as presented.

Figure 5:
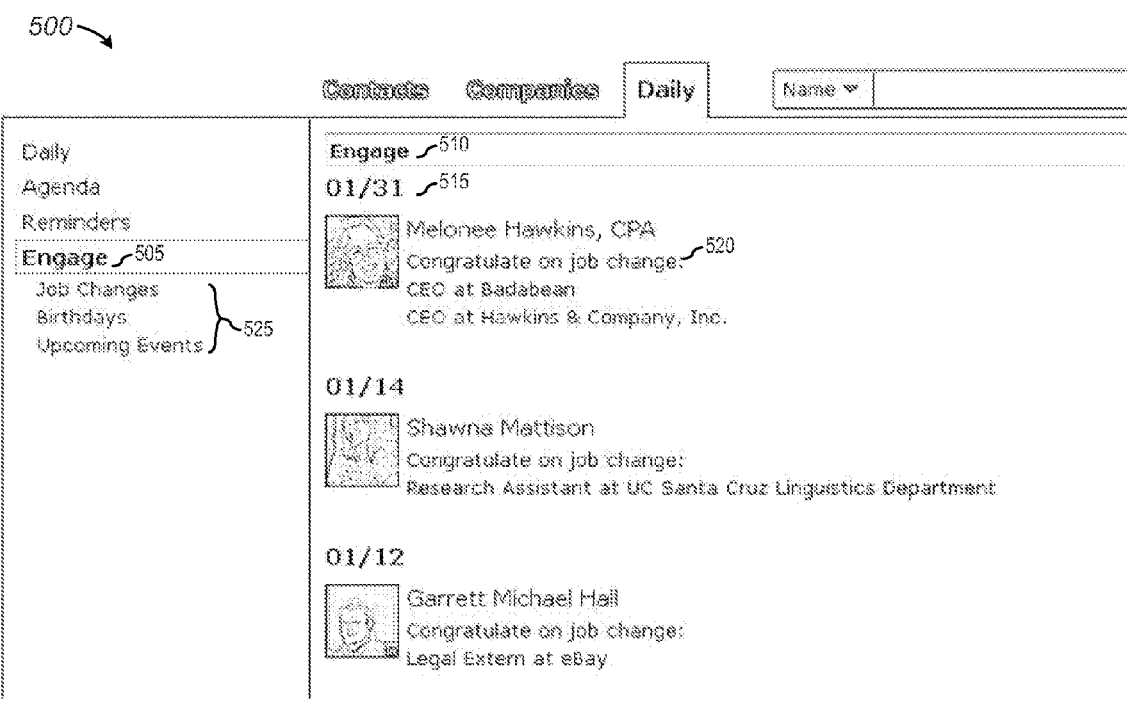
FIG. 5 is a diagrammatic representation of a daily engage information webpage, according to example embodiment.

FIG. 5 is a diagrammatic representation of a daily engage webpage 500, according to example embodiment. The daily engage webpage 500 includes a daily engage tab 505 that when selected causes the display of an engage banner 510 beneath which in engagement listing is presenting including an engagement date 515 and an engage connection link 520.

Figure 6:
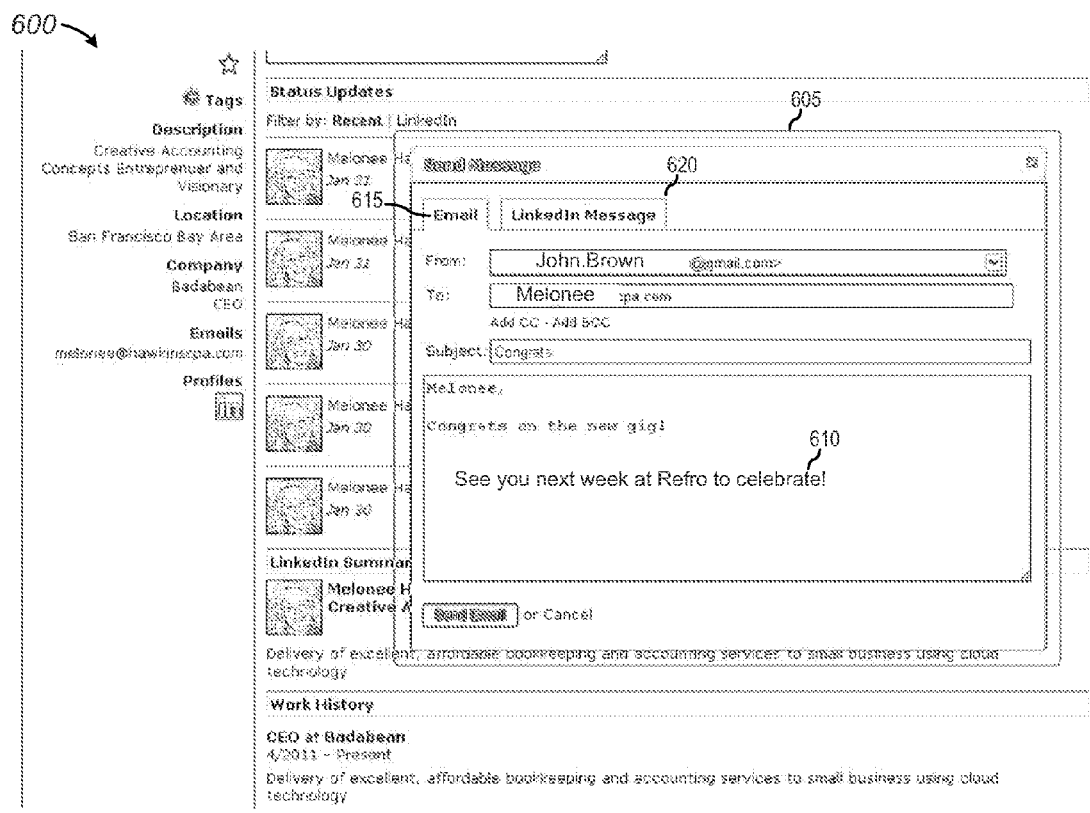
FIG. 6 is a diagrammatic representation of a daily engage congrats pop-up, according to example embodiment.

FIG. 6 is a diagrammatic representation of a daily engage congrats pop-up 600, as may be used in an example embodiment. A send message pop-up 605 may be triggered in the daily engage congrats pop-up 600 when the engage connection link 520 is selected by the user. The pop-up presents an e-mail tab 615 and a social networking message tab 620. According to further networking sites linked to the online address book by the user, further alternative messaging and communication tabs may be available in the send message pop-up 605.

After a click-selection of the engage connection link 520, the contact's profile is displayed and the send message pop-up 605 is triggered with a congratulatory e-mail template prefilled out. The template is a standard congratulatory e-mail template which may be tailored for e-mail or social networking message communications. The user may add a communicative input in the form of a note to accompany the congratulatory template produced in the send message pop-up 605.

Figure 7:
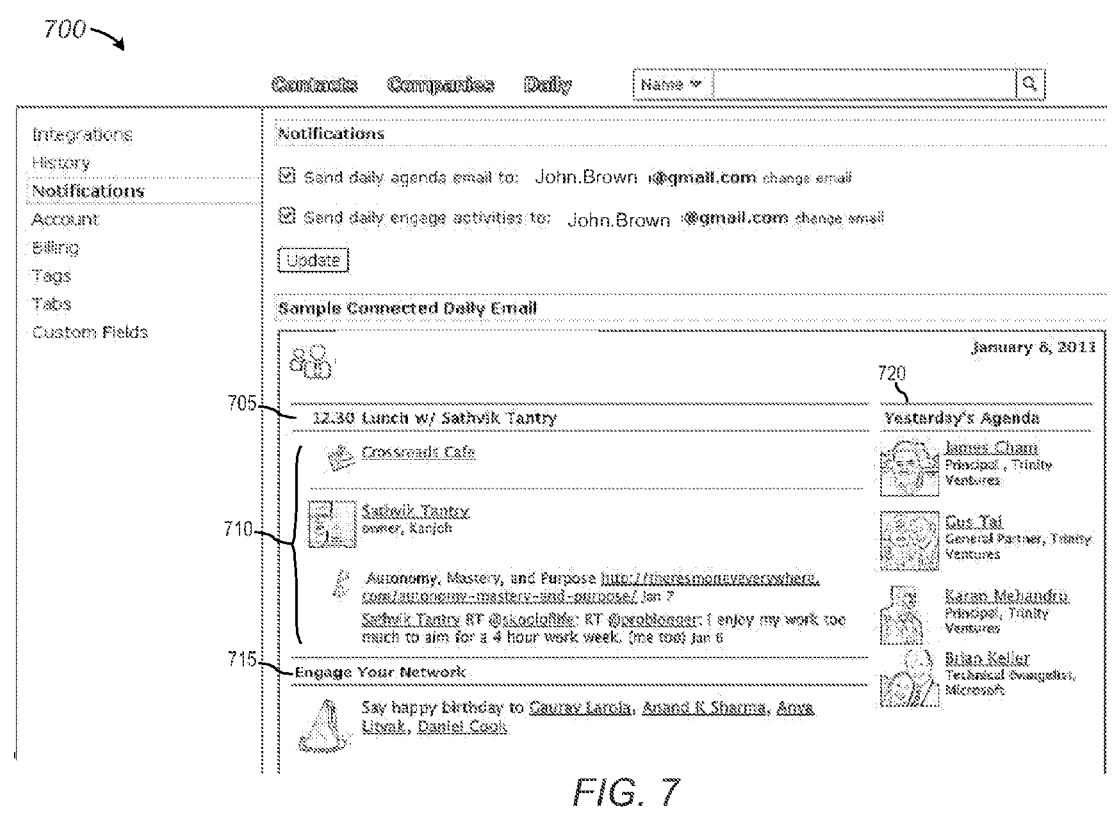

FIG. 7 is a diagrammatic representation of a daily connection e-mail 700, according to example embodiment. The daily connection e-mail 700 includes agenda outlined entry 705 intermixed with a further connection items 710 including an event location (e.g., a restaurant or a café for a lunch engagement), recent communications by e-mail, meetings, and blog posts, for example. In engage view 715 may also be presented in the daily connection e-mail 700. In the engage view 715 contacts with birthdays may be listed along with links to their profile pages where a sent message pop-up 605 may be presented to send the selected contact a birthday congratulations message.

Yesterdays agenda 720 may also be presented. Yesterdays agenda 720 is a list of agenda items including network picture and profile snippets produced from yesterdays agenda items. Presentation of the list of these agenda items is intended to spark follow up action either through e-mail or the managing of notes taken in meetings.

Figure 8:
FIG. 8 is a diagrammatic representation of a further daily e-mail of connection information, according to example embodiment.

FIG. 8 is a diagrammatic representation of a further daily connection e-mail 800, according to example embodiment. The further daily connection e-mail 800 is a decent in the presentation of the daily connection e-mail 700. The body of the daily connection e-mail 700 may present an event location 805, an attendee 810 including a profile snippet, their name, and a link to their profile. The e-mail body may also show general communications 815 such as blog postings the attendee 810 may have been placing with various networking sites including social networking sites, refreshable networking sites, and blog posting sites. The e-mail body may also include messages 820 the user has exchanged with the attendee as well as meetings 822 the attendee and user have attended. Contact information 825 for the attendee 810 may also be listed in may typically include an e-mail address and a phone number. The daily connection e-mail 700 may also include a listing of common contacts 830 the attendee 810 and the user have in common.

System

Figure 9:
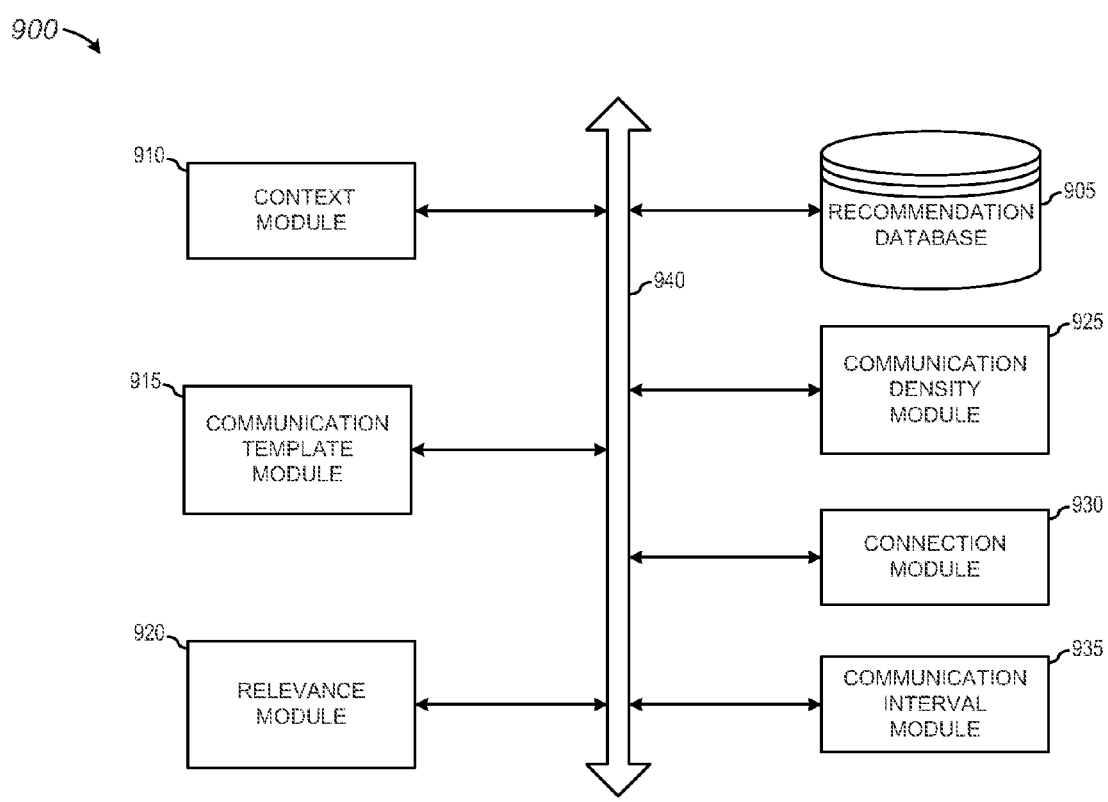
FIG. 9 is a block diagram illustrating online address book system modules, as may be used in an example embodiment.

FIG. 9 is a block diagram illustrating online address book system modules 900, according to an example embodiment. The online address book system modules 900 include a server (not shown) that includes at least one processing device configured to implement at least the respective address book processing modules listed herein. The online address book system modules 900 include a computer memory storing a contact database 905 that in turn includes such address book system elements as contact entries and the connection descriptors. Further modules included in the online address book system modules 900 are a context module 910 that may be configured to determine a context of a connection descriptor. A communication template module 915 may be configured to determine a communication template type, including one of a communication channel type and a connection content type, according to a degree of recency.

The online address book system modules 900 may also include a relevance module 920 that may be configured to determine relevancy affiliated with contact information. A communication density module 925 configured to monitor a communication density of communications to a contact and conducted according to a communication channel. A connection module configured 930 to determine a connection threshold of a connection descriptor. A communication interval module 935 configured to determine an amount of time since a previous communication. All of the modules in the online address book system modules 900 are communicatively coupled through a data bus 940 to one another.

Methods

Figure 10:
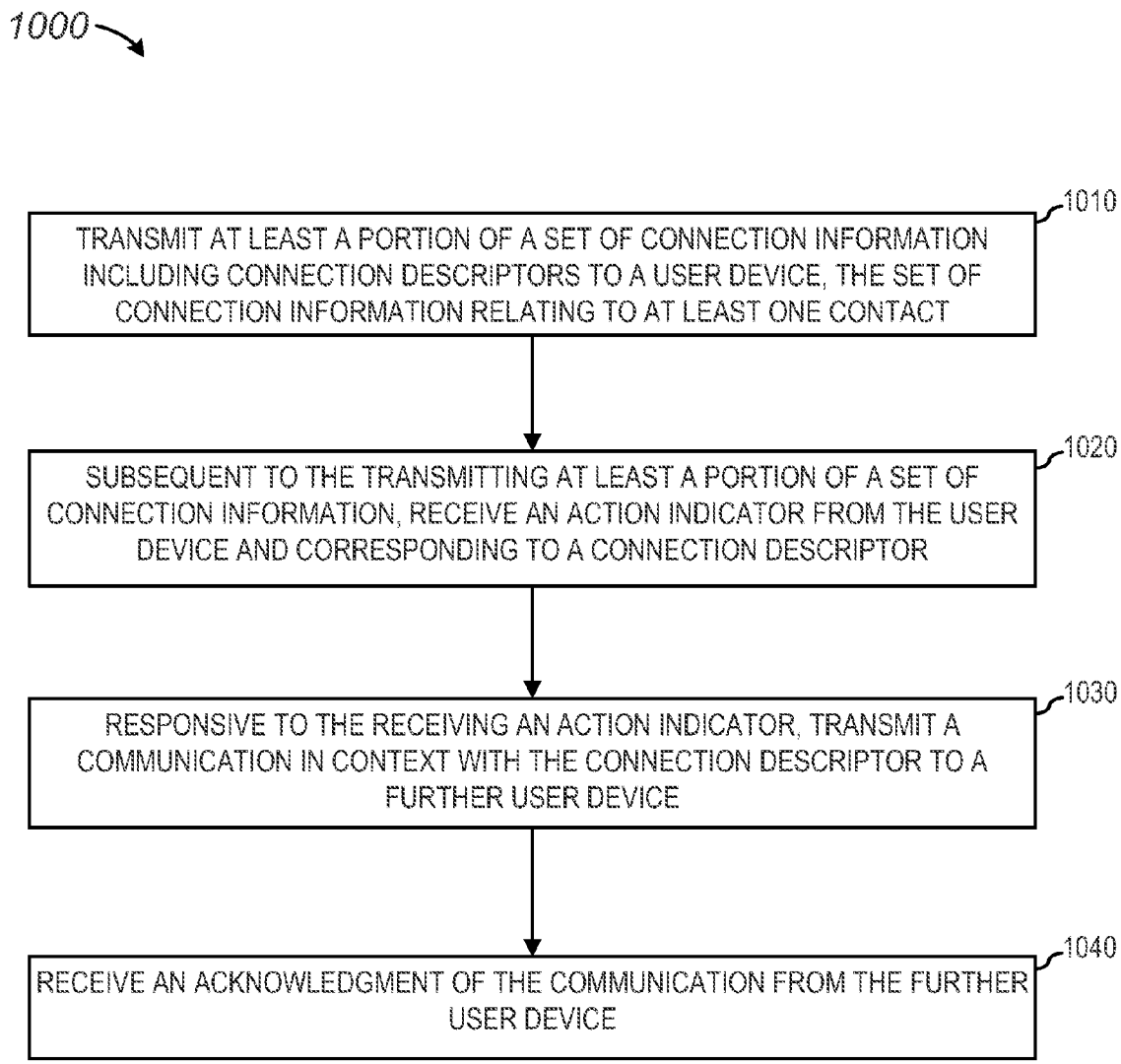
FIG. 10 is a flow chart illustrating a method to transmit connection information to a user device, according to an example embodiment.

FIG. 10 is a flow chart illustrating a method to transmit connection information to a user device 1000, according to an example embodiment. The method to transmit connection information to a user device 1000 may be performed by any of the modules, logic, or components described herein. The method commences with transmitting 1010 at least a portion of a set of connection information including connection descriptors to a user device, the set of connection information relating to at least one contact. Subsequent to the transmitting at least a portion of a set of connection information, the method continues with receiving 1020 an action indicator from the user device and corresponding to a connection descriptor. Responsive to the receiving an action indicator, transmitting 1030 a communication in context with the connection descriptor to a further user device. The method concludes with receiving 1040 an acknowledgment of the communication from the further user device.

Figure 11:
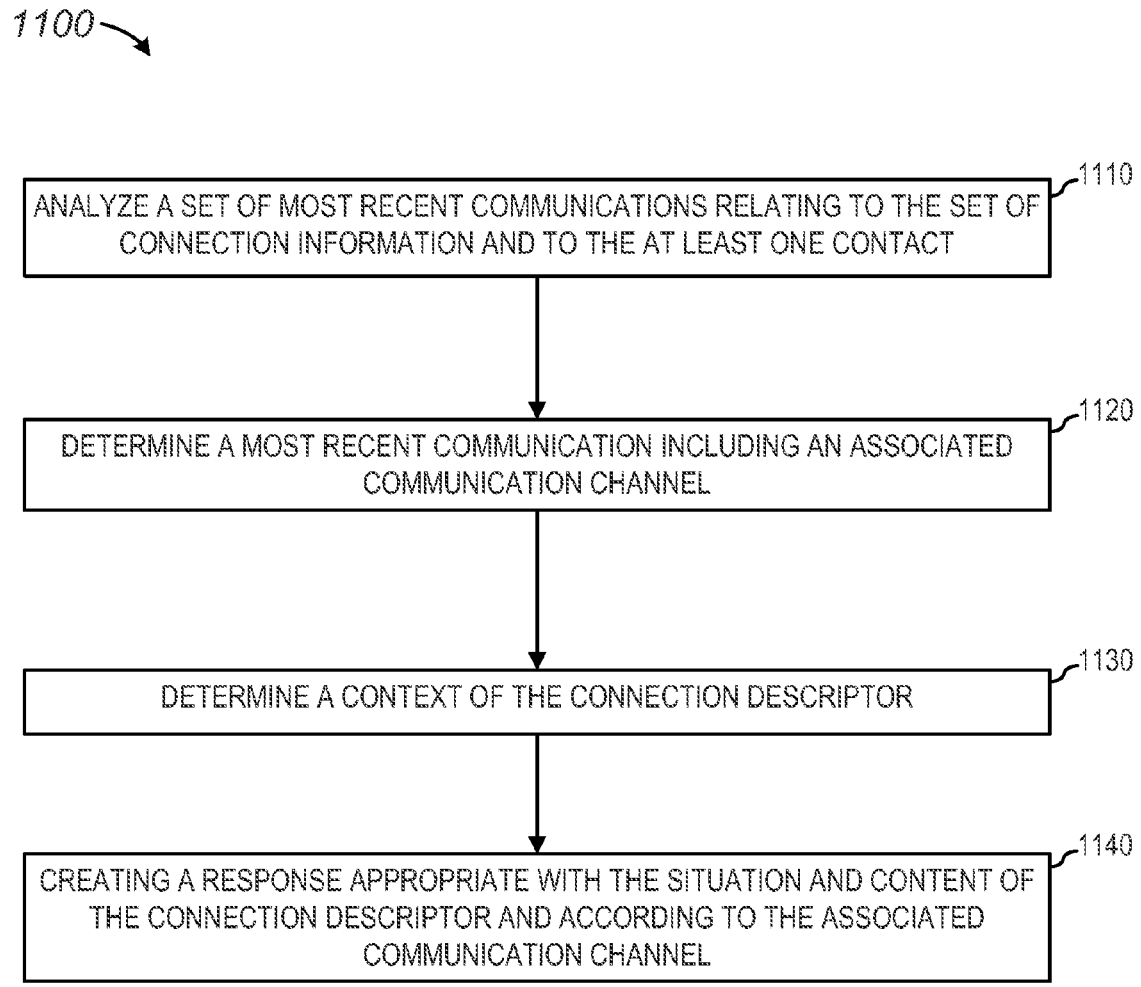
FIG. 11 is a flow chart illustrating a method to determine a response context and appropriate communication channel, as may be used in an example embodiment.

FIG. 11 is a flow chart illustrating a method to determine a response context and appropriate communication channel 1100, as may be used in an example embodiment. The method to determine a response context and appropriate communication channel 1100, as may be used in an example embodiment may be performed by any of the modules, logic, or components described herein. The method commences with analyzing 1110 a set of most recent communications relating to the set of connection information and to the at least one contact and continues with determining 1120 a most recent communication including an associated communication channel. The method carries on by determining 1130 a context of the connection descriptor. Responsive to the determining a context of the connection descriptor, the method creates 1140 a response appropriate with the situation and content of the connection descriptor and according to the associated communication channel. The context may include a new event, a new job, a promotion, a holiday, or a birthday and the communication channel may be at least one of a communication type, a communication medium, and a networking site.

Figure 12:
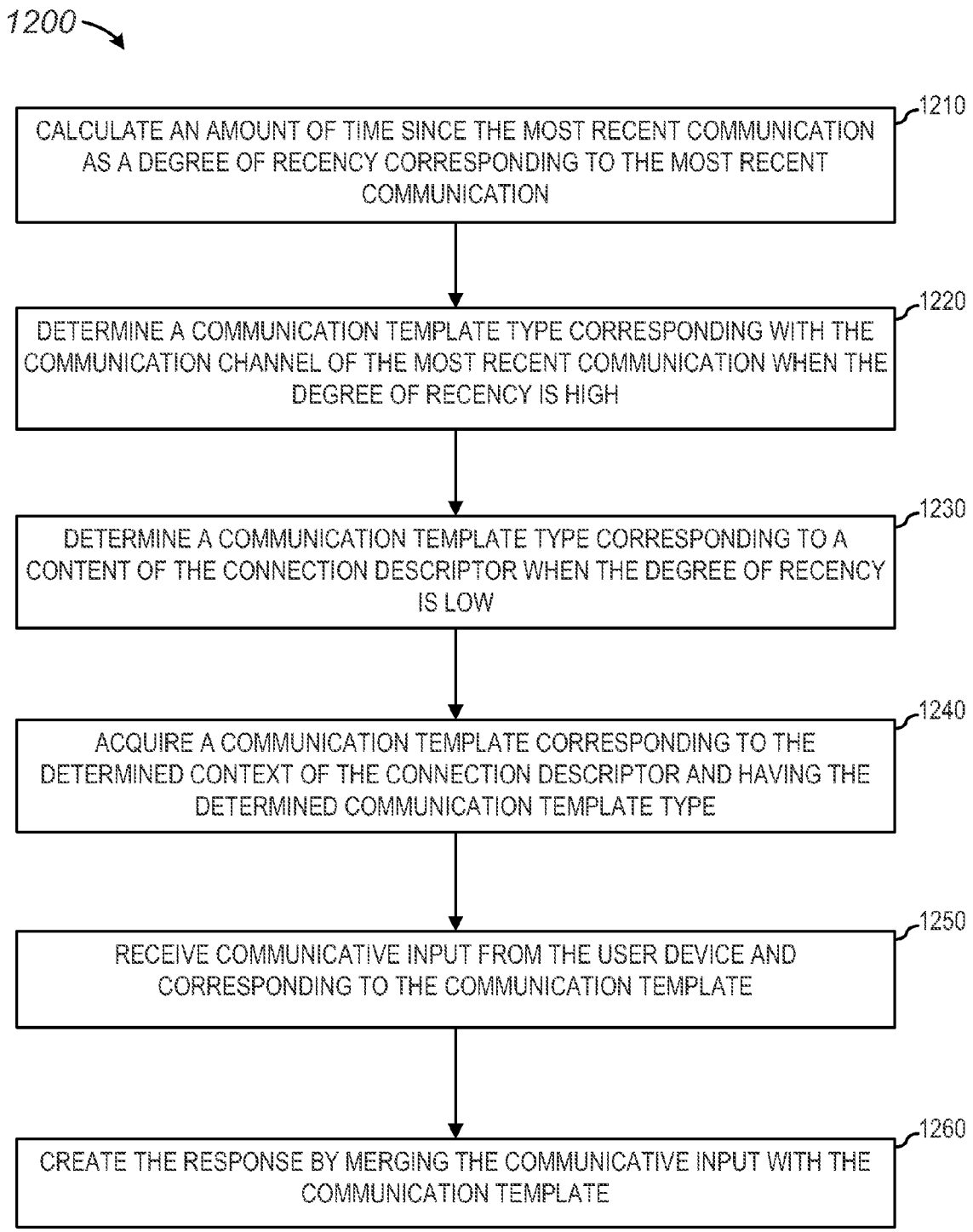
FIG. 12 is a flow chart illustrating a method to determine an appropriate communication template and response, according to an example embodiment.

FIG. 12 is a flow chart illustrating a method to determine an appropriate communication template and response 1200, according to an example embodiment. The method to determine an appropriate communication template and response 1200, according to an example embodiment may be performed by any of the modules, logic, or components described herein. The method commences by calculating 1210 an amount of time since the most recent communication as a degree of recency corresponding to the most recent communication. The method persists by determining 1220 a communication template type corresponding with the communication channel of the most recent communication when the degree of recency is high determines 1230 a communication template type corresponding to a content of the connection descriptor when the degree of recency is low. The method carries on with acquiring 1240 a communication template corresponding to the determined context of the connection descriptor and having the determined communication template type. Subsequent to the acquiring a communication template, receiving 1250 communicative input from the user device and corresponding to the communication template. The method concludes by creating 1260 the response by merging the communicative input with the communication template.

FIG. 13 is a flow chart illustrating a method to determine a common interest to share in communication 1300, as may be used in an example embodiment. The method to determine a common interest to share in communication 1300, as may be used in an example embodiment may be performed by any of the modules, logic, or components described herein. The method commences by determining 1310 a connection threshold of a connection descriptor, the connection threshold determining inclusion of the connection descriptor in the transmitting at least a portion of a set of connection information, and the connection threshold determined by: locating 1320 a network posting of the connection descriptor that reveals a content that includes one of: an interest 1330 in one of a hobby, a sport, and an activity; an attendance 1340 of one of a conference, a convention, a presentation, and a show; or an indication 1350 of one of an affinity toward and an interest to share a connection event including one of an entertainment event, a sporting event, a team event, a concert, and a performance. The content of the connection descriptor corresponds with a content of a further connection descriptor in the current networking profile of the user operating the user device.

Figure 14:
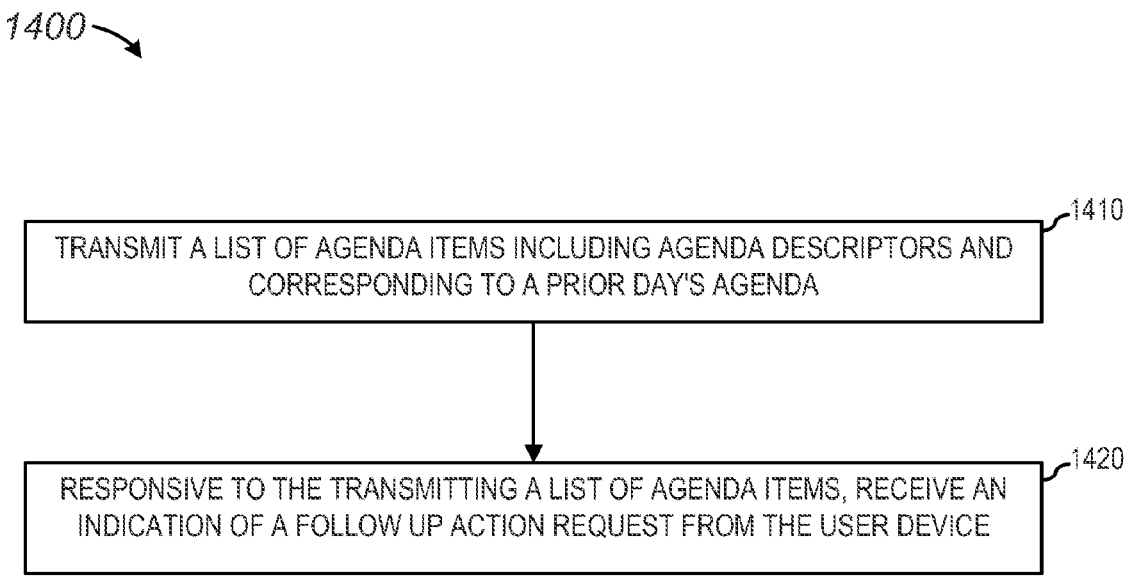
FIG. 14 is a flow chart illustrating a method to solicit agenda follow-up action, according to an example embodiment.

FIG. 14 is a flow chart illustrating a method to solicit agenda follow-up action 1400, according to an example embodiment. The method to solicit agenda follow-up action 1400, according to an example embodiment may be performed by any of the modules, logic, or components described herein. The method commences by transmitting 1410 a list of agenda items that include agenda descriptors and correspond to a prior days agenda. Responsive to the transmitting a list of agenda items, receiving 1420 an indication of a follow up action request from the user device.

The list of agenda items includes at least one or the other of a networking user photo or a user profile snippet and the followed up action request is an e-mail notification or a reminder to manage meeting notes.

Figure 15:
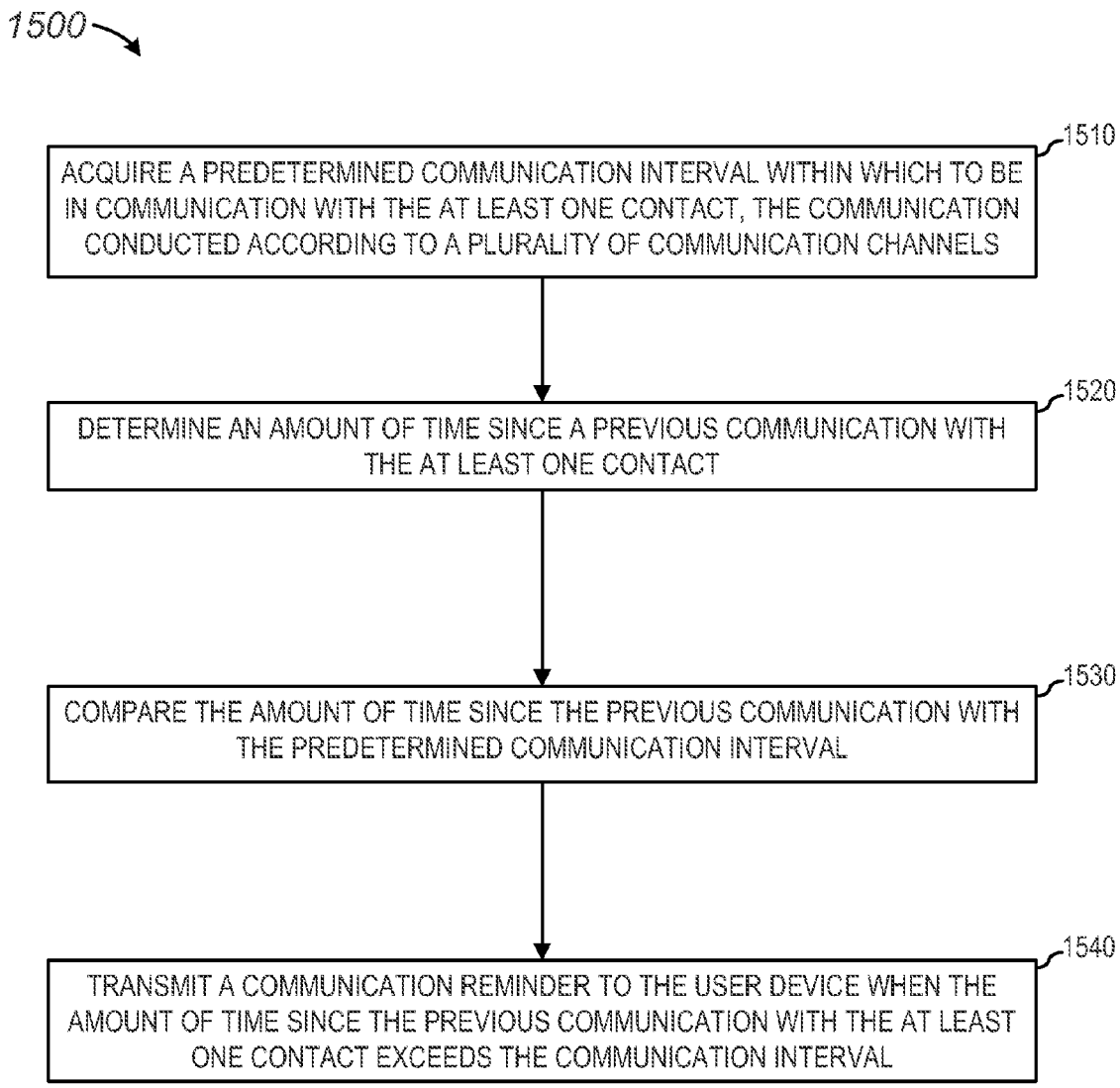
FIG. 15 is a flow chart illustrating a method to determine and transmit a communication reminder, as may be used in an example embodiment.

FIG. 15 is a flow chart illustrating a method to determine and transmitting a communication reminder 1500, as may be used in an example embodiment. The method to determine and transmit a communication reminder 1500, as may be used in an example embodiment may be performed by any of the modules, logic, or components described herein. The method commences with acquiring 1510 a predetermined communication interval within which to be in communication with the at least one contact, the communication conducted according to a plurality of communication channels. According to each respective communication channel: subsequent to acquiring a predetermined communication interval, determining 1520 an amount of time since a previous communication with the at least one contact. Responsive to determining the amount of time since a previous communication, comparing 1530 the amount of time since the previous communication with the predetermined communication interval. Corresponding to the respective communication channel, transmitting 1540 a communication reminder to the user device when the amount of time since the previous communication with the contact exceeds the communication interval.

Figure 16:
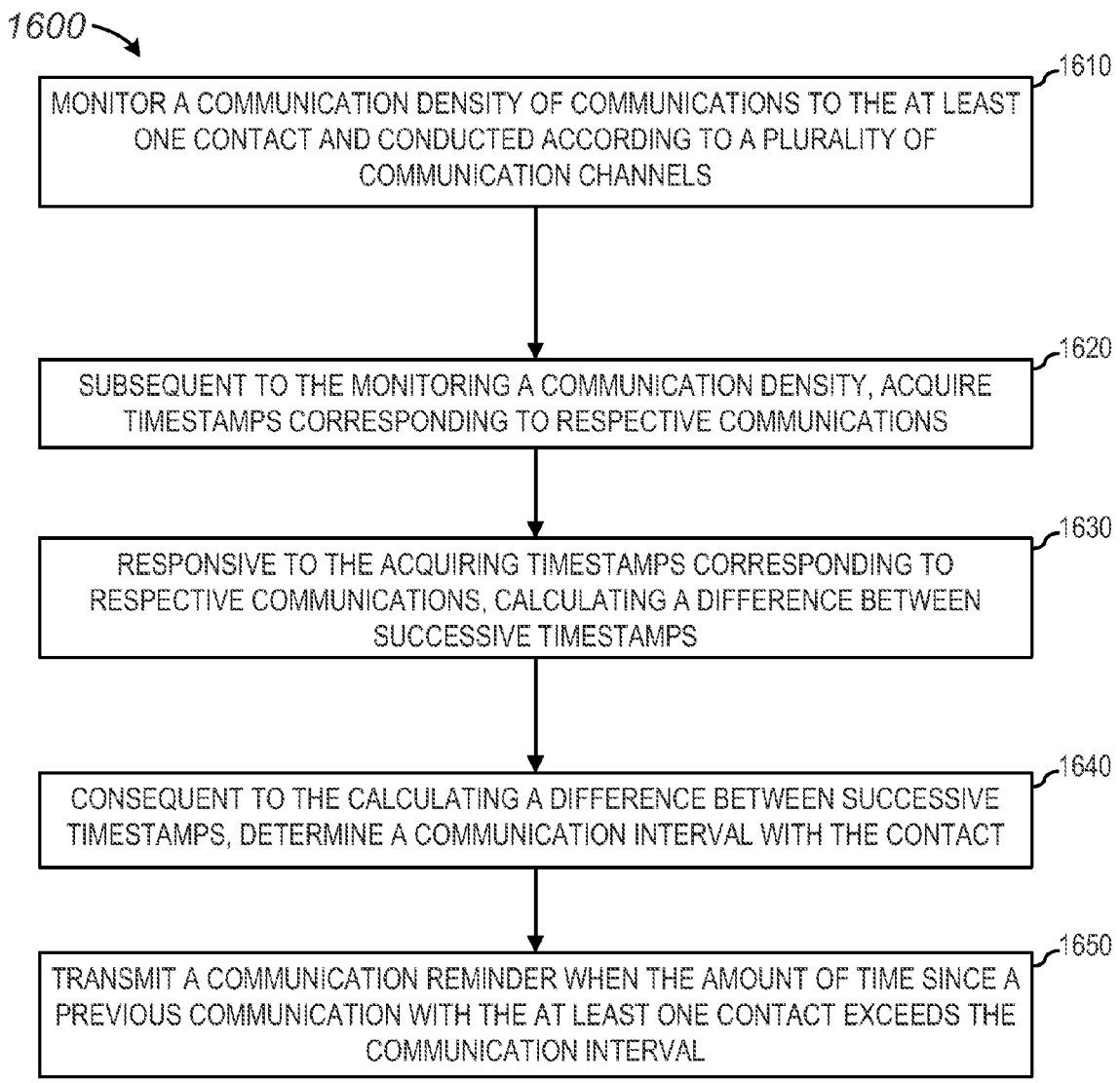
FIG. 16 is a flow chart illustrating a method to determine recency of communication and a communication reminder, according to an example embodiment.

FIG. 16 is a flow chart illustrating a method to determine recency of communication and a communication reminder 1600, according to an example embodiment. The method to determine recency of communication and a communication reminder 1600, according to an example embodiment may be performed by any of the modules, logic, or components described herein. The method commences by monitoring 1610 a communication density of communications to the at least one contact and conducted according to a plurality of communication channels. According to each respective communication channel: subsequent to the monitoring a communication density, acquiring 1620 timestamps corresponding to respective communications and calculating 1630 a difference between successive timestamps. From the calculation of the difference between successive timestamps, determining 1640 a communication interval with the contact and transmitting 1650 a communication reminder when the amount of time since a previous communication with the contact exceeds the communication interval.

Figure 17:
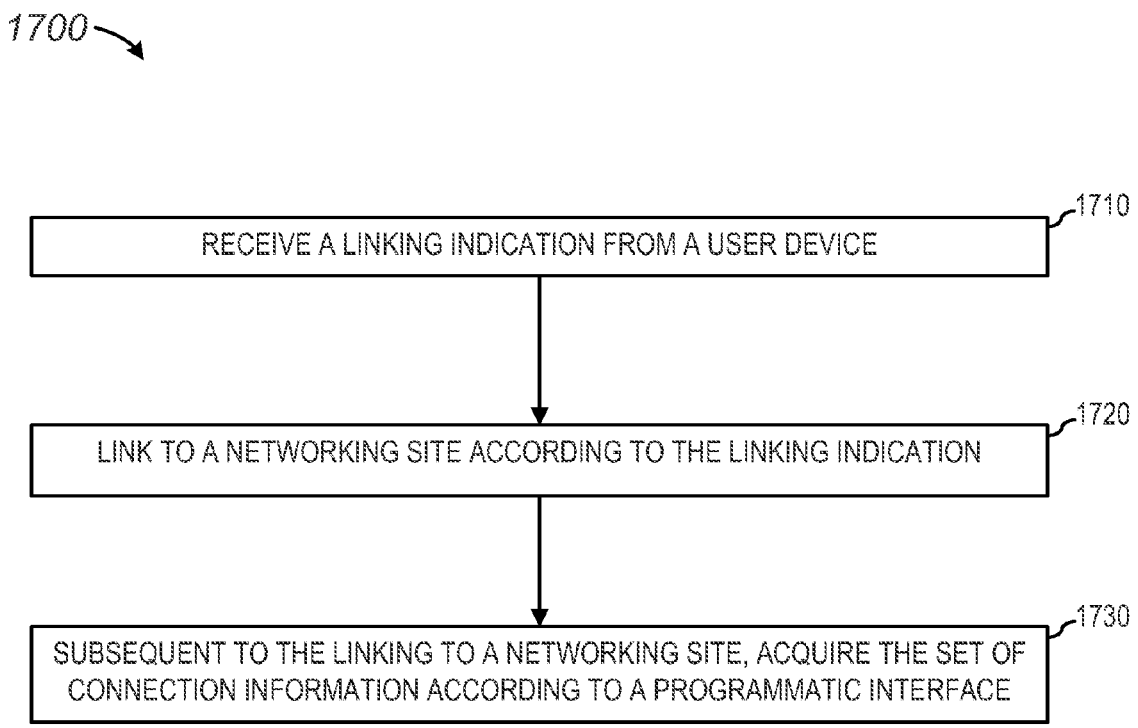
FIG. 17 is a flow chart illustrating a method to programmatically acquire connection information programmatically, as may be used in an example embodiment.

FIG. 17 is a flow chart illustrating a method to programmatically acquire connection information programmatically 1700, as may be used in an example embodiment. The method to programmatically acquire connection information programmatically 1700, as may be used in an example embodiment may be performed by any of the modules, logic, or components described herein. The method commences with receiving 1710 a linking indication from a user device and continues with linking 1720 to a networking site according to the linking indication. Subsequent to the linking to a networking site, the method concludes with acquiring 1730 the set of connection information according to a programmatic interface. The networking site is either a social networking site, professional connection networking site, short messaging site, or an e-mail site and the connection information is either agenda information, engagement information, or reminder information.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Machine Architecture

Figure 18:
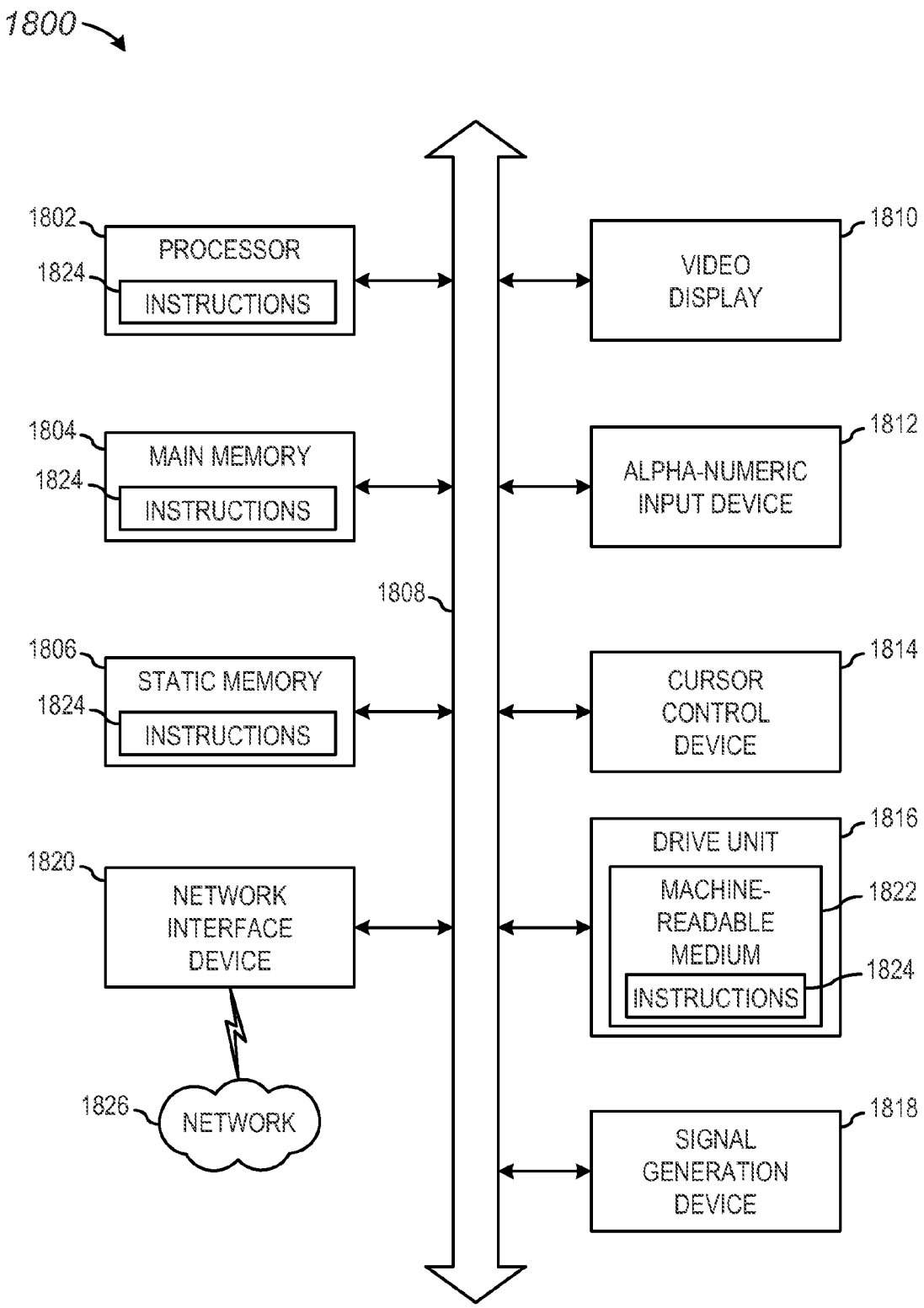
FIG. 18 is a block diagram of machine in the example form of a computer system within which a set instructions, for causing the machine to perform any one or more of the methodologies discussed herein, may be executed.

FIG. 18 is a block diagram of machine in the example form of a computer system 1800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation device 1814 (e.g., a mouse), a disk drive unit 1816, a signal generation device 1818 (e.g., a speaker) and a network interface device 1820.

Machine-Readable Medium

The disk drive unit 1816 includes a machine-readable medium 1822 on which is stored one or more sets of instructions and data structures (e.g., software) 1824 embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media.

While the machine-readable medium 1822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Plural instances may be provided for components, operations, or structures described herein as a single instance. Finally, boundaries between various components, operations, and data stores may be somewhat arbitrary, and particular operations may be illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   determining a most recent communication in a set of recent communications relating to a set of connection information including connection descriptors, the set of connection information relating to a contact, the most recent communication being associated with a communication channel and a connection descriptor;
   determining a context of the connection descriptor;
   calculating an amount of time since the most recent communication as a degree of recency corresponding to the most recent communication;
   identifying a template type corresponding to a content of the connection descriptor based on the degree of recency;
   generating a communication based on the context of the connection descriptor, the content of the connection descriptor, and the template of the template type, and according to the communication channel associated with the most recent communication; and
   transmitting the communication to a user device.

2. The method of claim 1, wherein the set of connection information includes:
   at least one of agenda information, engagement information, and reminder information, wherein the agenda information includes at least one of a calendar event, a holiday, a conference, a convention, a party, a commemorative event, and a meeting notice having a meeting header including at least one of a title, a location, and a time, the engagement information includes at least one of a birthday, a wedding, a party, and a special event, the reminder information includes one of an historical agenda item, an indication of an amount of time since a previous communication, an indication of a communication channel involved in the previous communication, and the communication channel includes a communication medium comprising at least one of an e-mail, a phone call, a posting, a message, and an in-person meeting.

3. The method of claim 1, wherein the connection descriptor comprises at least one of:
   a status update including at least one of an indication of an update of a networking profile, a new event, and a blogging summary;
   a recent communication including at least one of an icon graphic, a link, a communication channel, and at least a portion of one of a meeting information, a message, an e-mail information, a blog post snippet, and a phone call information; and
   a contact indicator and an associated networking profile snippet, the contact indicator including an identifier of a connection to both the contact and a user account associated with the user device.

4. The method of claim 1, wherein the content of the connection descriptor comprises at least one of:
   an indication of an interest in at least one of a hobby, a sport, or an activity;
   an indication of an attendance of at least one of a conference, a convention, a presentation, or a show; and
   an indication of an affinity toward sharing a connection event including at least one of an entertainment event, a sporting event, a team event, a concert, or a performance.

5. The method of claim 1, further comprising:
   identifying the set of recent communications associated with the contact;
   receiving an action indicator from the user device, the action indicator corresponding to the connection descriptor; and
   based on the action indicator, causing a display of the set of recent communications associated with the contact in context with the connection descriptor in a user interface associated with the user device.

6. The method of claim 5, wherein the identifying of the set of recent communications associated with the contact includes:
   identifying one or more communications associated with the contact that occurred within a particular period of time, and wherein the causing of the display of the set of recent communications associated with the contact includes causing a display of the one or more communications together with an indication of the communication channel corresponding to the one or more communications.

7. The method of claim 1, further comprising:
   monitoring a communication density of communications to the contact conducted according to one or more communication channels;
   for each one or more communication channels:

subsequent to the monitoring of the communication density, acquiring timestamps corresponding to respective communications;

responsive to the acquiring of the timestamps corresponding to the respective communications, calculating a difference between successive timestamps;

consequent to the calculating of the difference between the successive timestamps, determining a communication interval with the contact; and transmitting a communication reminder based on a determination that the amount of time since a previous communication with the contact exceeds the communication interval.

8. The method of claim 1, wherein the context includes at least one of an event, a job, a promotion, a holiday, and a birthday.

9. The method of claim 1, wherein the communication channel includes at least one or a communication type, a communication medium, and a networking site.

10. The method of claim 1, further comprising:
transmitting the template of the template type to the user device; and
receiving communicative input that corresponds to the communication template from the user device, wherein the generating of the communication includes merging the communicative input with the template of the template type.

11. The method of claim 1, wherein the communication comprises one or more agenda items including agenda descriptors and corresponding to a prior day's agenda, the method further comprising:
responsive to the transmitting of the communication comprising the one or more agenda items, receiving an indication of a follow up action request from the user device, wherein the one or more agenda items include at least one of a networking user photo and a user profile snippet, and wherein the follow up action request includes at least one of an e-mail notification and a reminder to manage meeting notes.

12. The method of claim 1, further comprising:
acquiring a predetermined communication interval within which to be in communication with the contact, the communication conducted according to one or more communication channels;
for each one or more communication channels:
subsequent to the acquiring the predetermined communication interval, determining an amount of time since a previous communication with the contact;
responsive to the determining of the amount of time since the previous communication, comparing the amount of time since the previous communication with the predetermined communication interval; and
corresponding to a particular communication channel, transmitting a communication reminder to the user device based on a determination that the amount of time since the previous communication with the contact exceeds the communication interval.

13. The method of claim 1, further comprising:
receiving a linking indication from the user device;
linking to a networking site according to the linking indication; and
subsequent to the linking to the networking site, acquiring the set of connection information according to a programmatic interface, wherein the networking site includes at least one of a social networking site, a professional connection networking site, a short messaging site, and an e-mail site, and wherein the connection information includes at least one of agenda information, engagement information, and reminder information.

14. A system comprising:
a non-transitory machine-readable medium for storing instructions that, when executed by one or more hardware processors of a machine, cause the machine to perform operations comprising:
determining a most recent communication in a set of recent communications relating to a set of connection information including connection descriptors, the set of connection information relating to a contact, the most recent communication being associated with a communication channel and a connection descriptor;
determining a context of the connection descriptor;
calculating an amount of time since the most recent communication as a degree of recency corresponding to the most recent communication;
identifying a template type corresponding to a content of the connection descriptor based on the degree of recency;
generating a communication based on the context of the connection descriptor, the content of the connection descriptor, and the template of the template type, and according to the communication channel associated with the most recent communication; and
transmitting the communication to a user device.

15. The system of claim 14, wherein the operations further comprise:
identifying the set of recent communications associated with the contact;
receiving an action indicator from the user device, the action indicator corresponding to the connection descriptor; and
based on the action indicator, causing a display of the set of recent communications associated with the contact in context with the connection descriptor in a user interface associated with the user device.

16. The system of claim 14, wherein the operations further comprise:
monitoring a communication density of communications to the contact conducted according to one or more communication channels;
for each one or more communication channels:
subsequent to the monitoring of the communication density, acquiring timestamps corresponding to respective communications;
responsive to the acquiring of the timestamps corresponding to the respective communications, calculating a difference between successive timestamps;
consequent to the calculating of the difference between the successive timestamps, determining a communication interval with the contact; and
transmitting a communication reminder based on a determination that the amount of time since a previous communication with the contact exceeds the communication interval.

17. A non-transitory machine-readable storage medium comprising instructions that, when executed by one or more hardware processors of a machine, cause the machine to perform operations comprising:
determining a most recent communication in a set of recent communications relating to a set of connection information including connection descriptors, the set of connection information relating to a contact, the most recent communication being associated with a communication channel and a connection descriptor;

determining a context of the connection descriptor;
calculating an amount of time since the most recent communication as a degree of recency corresponding to the most recent communication;
identifying a template type corresponding to a content of the connection descriptor based on the degree of recency;
generating a communication based on the context of the connection descriptor, the content of the connection descriptor, and the template of the template type, and according to the communication channel associated with the most recent communication; and
transmitting the communication to a user device.

18. The method of claim 1, wherein the transmitting of the communication to the user device is performed in context with the connection descriptor.

* * * * *